United States Patent [19]
Gage et al.

[11] Patent Number: 5,903,537
[45] Date of Patent: May 11, 1999

[54] DIRECT READ DURING MARK FORMATION FOR LASER POWER CORRECTION

[75] Inventors: Edward C. Gage, Fairport; Clarke K. Eastman, Rochester, both of N.Y.; Roger A. Hajjar, San Jose, Calif.; Steven C. Dohmeier, Rochester, N.Y.

[73] Assignee: Eastman Kodak Company, Rochester, N.Y.

[21] Appl. No.: 08/834,571

[22] Filed: Apr. 7, 1997

[51] Int. Cl.⁶ ........................................ G11B 7/00
[52] U.S. Cl. .............................................. 369/116
[58] Field of Search ............................ 369/124, 59, 54, 369/58, 44.35, 44.29, 116

[56] References Cited

U.S. PATENT DOCUMENTS

| | | | |
|---|---|---|---|
| 5,216,660 | 6/1993 | Iimura | 369/116 |
| 5,363,363 | 11/1994 | Gage | 369/54 |
| 5,436,880 | 7/1995 | Eastman et al. | 369/124 |
| 5,446,716 | 8/1995 | Eastman et al. | 369/44.29 |
| 5,491,682 | 2/1996 | Dohmeier et al. | 369/124 |
| 5,495,466 | 2/1996 | Dohmeier et al. | 369/275.4 |
| 5,537,383 | 7/1996 | Gage et al. | 369/116 |
| 5,629,921 | 5/1997 | Eastman et al. | 369/54 |

*Primary Examiner*—Nabil Hindi
*Attorney, Agent, or Firm*—Pamela R. Crocker

[57] ABSTRACT

A recording apparatus and method are disclosed for forming marks on a recording medium. The recording apparatus includes an arrangement having an adjustable light source for producing a beam of light having first and second portions, with the second portion for recording marks on the medium, and an arrangement responsive to the first portion of the light beam and including a front facet detector positioned to receive the first portion of the light beam directly from the light source for producing a front facet signal. The recording apparatus also includes an arrangement for detecting light from the second portion of the light beam which is reflected from the medium and for producing a mark formation signal, and circuitry responsive to the front facet signal and the mark formation signal for producing a mark formation effectiveness signal. The recording apparatus further includes an arrangement for storing a mark formation effectiveness reference signal and circuitry responsive to the mark formation effectiveness signal and the mark formation effectiveness reference signal for adjusting the power of the light source during recording so that the amount of power is adjusted to maintain optimum mark quality.

21 Claims, 4 Drawing Sheets

DIRECT READ DURING MARK FORMATION FOR LASER POWER CORRECTION

FIELD OF THE INVENTION

The present invention relates to the field of optical data recording, and in particular, to monitoring of mark formation with correction for laser power during recording.

BACKGROUND OF THE INVENTION

In optical data recording, an optical source, typically a laser or laser diode, generates an incident write signal in the form of a radiation beam. The beam is applied to an optical medium to record data thereon as optically-detectable marks. The quality of recorded data in many optical recording systems is generally very sensitive to laser write power.

A commonly used technique for determining an initial optimum laser write power involves allocating a section of the recording media for power calibration measurements. Several recordings are made in the calibration section using a range of laser powers. The calibration recordings are read back, and the write power level which produced the best recording quality is selected as optimum. A measure of recorded data quality commonly used in compact disk (CD) recording is referred to as Beta, or simply β. β is defined in the Orange Book attachment B3.3. "Orange Book" is a licensed specification published by Philips Corporation and Sony Corporation which defines key properties of recordable compact disk (CD-R) media and recording procedures. β measures recorded mark length error by comparing positive and negative peaks of an AC-coupled readback waveform. Because the CD format uses a DC free data encoding scheme, when the marks have the proper length, β equals its target value (usually near zero). When the mark length increases, due to, for example, a recording power that is too high, β is more positive than its target value. Likewise, when the mark length decreases, β is more negative than its target value. The Optimum Recording Power (ORP) is the power which results in the target β value and is then used to record actual data in the program or user area of the media.

In most recording systems, however, recording power may need to be adjusted during recording because ORP varies as various system parameters fluctuate, for example, with media sensitivity, defocus, tilt, substrate thickness, birefringence, scratches, and contamination on the laser-incident substrate surface. One technique for continuously maintaining the ORP involves monitoring a reflection of the write signal from the medium, known as the Mark Formation (MF) signal, while data is being recorded. Systems which monitor the MF signal are generally referred to as Direct Read During Write (DRDW) systems. The MF signal is also used to avoid the need to subsequently read the data after recording by analyzing the MF signal to determine whether or not a mark has been properly formed, or, in other words, whether the data has been properly recorded on the medium.

Figure 1:
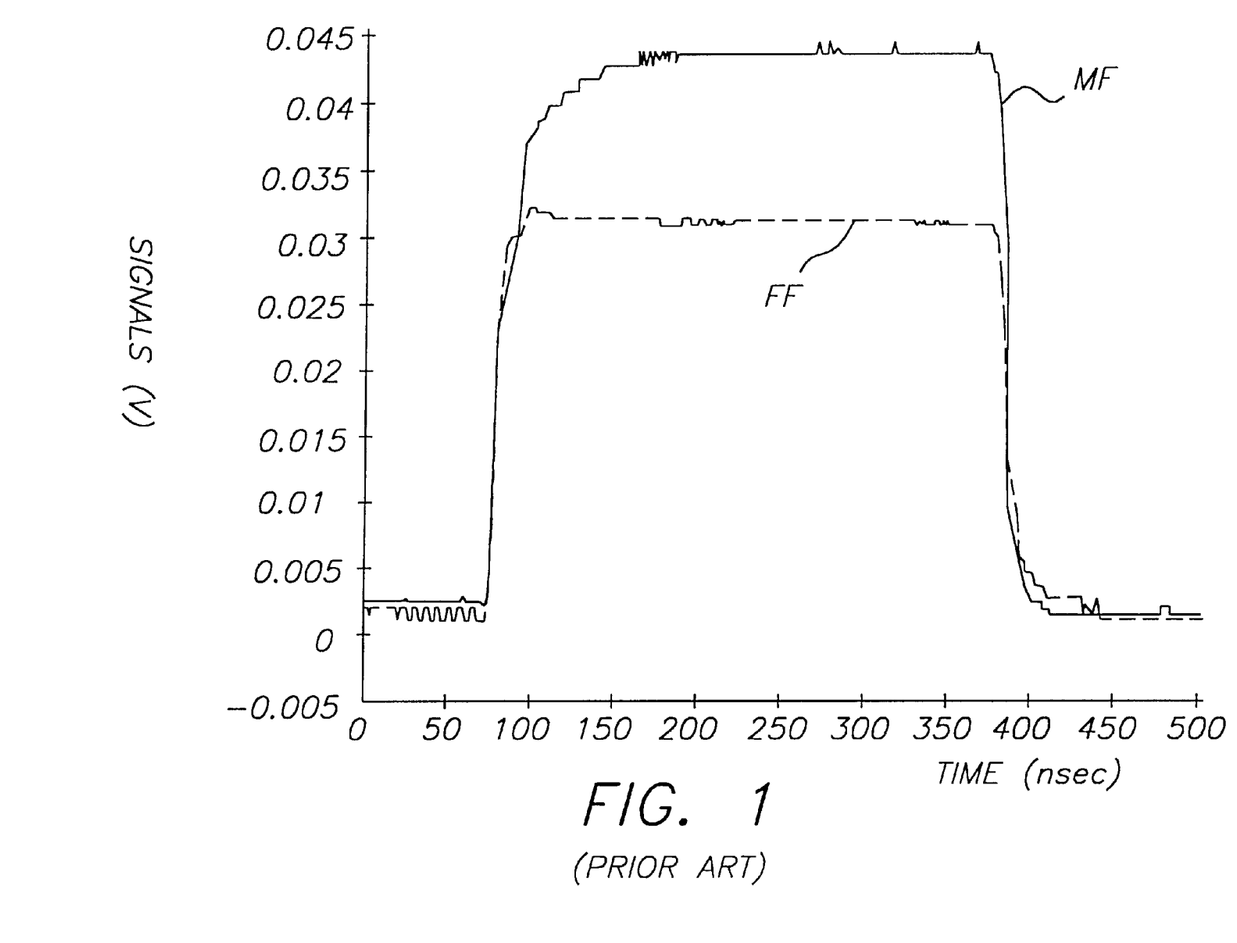
FIG. 1 is a graph of signal versus time for a typical burn bright recording medium showing a mark formation signal and a front facet signal.

FIG. 1 shows an MF signal for a typical prior art "burn bright" optical recording medium, in which a mark is an area of increased reflectivity, and a front facet (FF) signal from one laser write pulse of duration 8 Tclock. The FF signal is produced by a detector placed in front of the laser, also known as a front facet monitor (FFM), and can be used to monitor laser power. Tclock is the channel clock period. For CD-R format, for example, the minimum mark length is 3 channel clock periods, or 3 Tclock.

As shown in FIG. 1, the MF signal varies with time, t, and has a rate of change resulting from a change in reflectivity of the optical medium as the mark is formed thereon. For t<0, the MF signal is the reflected intensity of the unmarked medium at the read laser power. Increasing the laser power to a writing level at t=0 in order to form a mark results in an increase in the MF signal. During the write pulse, the MF signal continues to gradually increase. The maximum steady state signal attained is referred to as a "plateau." Subsequent to the high power laser write pulse, at t=8 Tclock, the laser reverts to read power. The MF signal decreases to above that of the unrecorded medium because of the finite extent of the optical spot, which samples both the unwritten and written portions of the medium. At t>8 Tclock, the MF signal gradually settles back to its original value at t<0. For burn bright media, the difference between the initial level of the MF signal at the start of the laser write pulse and the final plateau level at the end of the laser write pulse is relatively low. Because of its small amplitude, the MF signal is easily distorted by fluctuations in the laser write power level during mark formation.

Certain characteristics of the MF signal, including, for example, the voltage levels before and during the steady state plateau portion of the MF signal during a write pulse, as well as any estimates or transformations thereof, can be used to determine whether the laser write power level needs to be adjusted. These MF signal characteristics are generally referred to as Mark Formation Effectiveness (MFE) signals. During calibration, an optimum value of an MFE signal can be determined and stored. A servo loop can then be used during actual data recording to adjust the laser write power when the MFE signal deviates from the optimum, or previously stored reference, MFE signal value. The optimum MFE signal, for example, might be the value during recording which results in the target β value. A technique to servo the laser write power on optical recording media during recording is disclosed, for example, in commonly assigned U.S. Pat. No. 5,436,880, entitled "Laser Power Control In An Optical Recording System Using Partial Correction of Reflected Signal Error," and in commonly assigned U.S. Pat. No. 5,446,716, entitled "Laser Power Control In An Optical Recording System to Compensate For Multiple System Degradations," the disclosures of which are incorporated herein by reference.

Apparatus for generating an MFE signal to verify data as it is recording on an optical medium is disclosed in commonly assigned U.S. Pat. No. 5,495,466, entitled "Write Verification In An Optical Recording System By Sensing Mark Formation While Writing DRDW with Recordable Compact Disk," the disclosure of which is incorporated by reference. The MFE signal generated in U.S. Pat. No. 5,495,466 estimates a normalized rate of change of the reflected write pulse as a mark is being formed to provide an indication of the quality of mark formation on the optical medium. A technique to generate an MFE signal to control laser write power during recording is also disclosed in U.S. Pat. No. 5,216,660, entitled "Method of Optimally Controlling the Power of a Recording Laser Beam," assigned to Sony Corporation.

These techniques are especially useful for "burn dark" optical recording media, such as recordable compact disks (CD-R's), in which a mark is an area of reduced reflectivity. The media reflectivity declines from a high reflectivity value to a low reflectivity value during the course of a write pulse. In other words, with burn dark media, the difference between the initial peak of the MF signal at the start of the laser write pulse and the final plateau level during mark formation is high. Thus, MF signals for typical burn dark media may be less affected by fluctuations in laser write power during mark formation. However, MF signals for burn bright media can be affected to a much larger degree by fluctuations of laser power during mark formation. As a result, the MFE signals generated using prior art techniques are much more susceptible to error.

SUMMARY OF THE INVENTION

Accordingly, it is an object of the present invention to correct for fluctuations of laser write power during mark formation.

This object is achieved by a recording apparatus for forming marks on a medium, comprising:

(a) means including an adjustable light source for producing a beam of light having first and second portions, with the second portion for recording marks on the medium;

(b) means responsive to the first portion of the light beam and including a front facet detector positioned to receive the first portion of the light beam directly from the light source for producing a front facet signal;

(c) means for detecting light from the second portion of the light beam which is reflected from the medium and for producing a mark formation signal;

(d) means responsive to the front facet signal and the mark formation signal for producing a mark formation effectiveness signal;

(e) means for storing a mark formation effectiveness reference signal; and (f) means responsive to the mark formation effectiveness signal and the mark formation effectiveness reference signal for adjusting the power of the light source during recording so that the amount of power is adjusted to maintain optimum mark quality.

ADVANTAGES

A feature of the present invention is that it provides an improved method of determining the characteristics of mark formation used to adjust the laser power during mark formation and to verify recorded mark quality.

Another feature of the present invention is that recording quality is maintained despite changes in medium sensitivity, birefringence, temperature, and defocus.

Yet another feature of the present invention is that distortions in mark formation measurement caused by laser power variations can be corrected using signals from components (i.e., front facet detector and data detector) which are commonly found in existing recording systems.

A further feature of the present invention is that dynamic range and signal to noise ratio of the mark formation measurement are increased by substantially eliminating unwanted common mode signal and noise.

DETAILED DESCRIPTION OF THE PREFERRED EMBODIMENT

Figure 2:
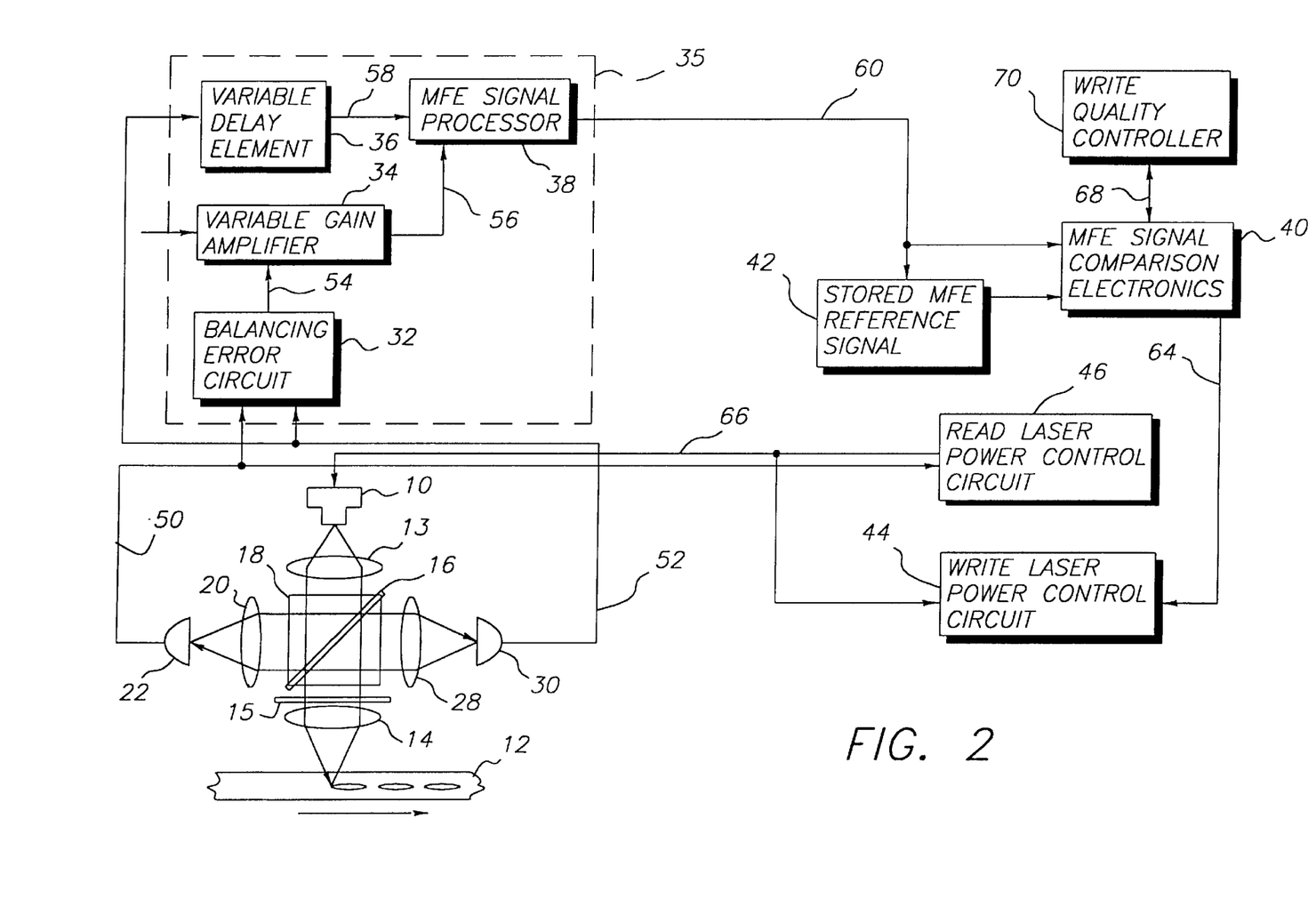
FIG. 2. is a schematic diagram partially in block form of a recording apparatus in accordance with the present invention.

Referring to FIG. 2, a recording apparatus in accordance with the present invention is shown which utilizes a front facet (FF) signal and a mark formation effectiveness (MFE) signal to provide dynamic control of laser write power during mark formation. As shown in FIG. 2, an incident radiation beam is generated by an optical source 10 for recording marks on an optical recording medium 12. The optical source 10 can include, for example, a laser or a laser diode and a controller, and will be referred to herein as a laser. It should be understood, however, that the techniques of the present invention can be used with other types of optical sources. The recording medium 12 typically includes data tracks (not shown) arranged in a spiral or concentric circles on a data storage surface (not shown). The radiation beam from the laser 10 is collimated by a lens 13 and directed to surface 16 of a beam splitter 18.

The beam splitter 18 can have, for example, intensity reflectivities of $R_p=10$ percent and $R_s=99$ percent, as determined by particular coatings on surface 16. With the laser 10 aligned so that it is predominately p-polarized with respect to the beam splitter 18, a portion of the collimated light beam, i.e. 10 percent, is reflected by surface 16 of the beam splitter 18 toward a detector focusing lens 20 and thereby focused onto a front facet detector 22. The front facet detector 22 generates a front facet (FF) signal 50 from the incident beam. In accordance with the present invention, the FF signal 50 is used in determining the characteristics of mark formation, to measure the power of the laser 10, and to verify proper data recording in a manner to be described in greater detail below.

The FF signal 50 output from the front facet detector 22 can also be used in a read laser power control circuit 46 to maintain the output power level of the laser 10 at a desired value during reading of the data. The circuit 46 adjusts its current output and thereby the intensity level of the radiation beam generated by the laser 10. The circuit 46, laser 10 and front facet detector 22 thus form a source power servo loop which adjusts the laser read power as a function of the FF signal 50.

Any of a number of alternative techniques could be used to detect radiation from the laser 10 in order to provide an indication of the intensity level of the incident beam. For example, radiation from the rear facet of the laser could be detected by suitable arrangement of a detector in a path of the rear facet radiation. It should be noted, however, that a detector of front facet radiation often exhibits higher bandwidth and improved linearity and repeatability, and is less susceptible to temperature variation than a detector of rear facet radiation. It should also be noted that the FF signal 50 from the front facet detector 22 can be used to normalize other signals such as focus, tracking, and data signals using methods well known to those skilled in the art.

Referring again to FIG. 2, the portion of the light beam which is not reflected by surface 16 to the front facet detector 22, i.e. 90 percent, is transmitted through surface 16, then through a quarter wave plate (QWP) 15 to an objective lens 14 which focuses the light beam onto the recording medium 12. The QWP 15 induces a circular polarization state of the incident beam. The position of the objective lens 14 is adjusted by an optical actuator (not shown) to maintain the light beam from the laser 10 in focus and on track. A carriage assembly (not shown) typically provides cross-track movement of the optical spot on the surface of the recording medium 12. By modifying the power level of the incident beam, data in the form of marks are recorded on the recording medium 12.

Interaction of the incident beam with the recording medium 12 causes the incident beam to be reflected. The reflected beam, referred to hereinafter as a return beam, is recollimated by the objective lens 14, then passes through QWP 15 and is converted to substantially linearly polarized light. Surface 16 of the beam splitter 18 directs substantially all of the return beam to a data focusing lens 28. The use of the QWP 15 and beam splitter 18 is a well known optical isolation technique. The data focusing lens 28 focuses the return beam onto a data detector 30. The data detector 30 generates a mark formation (MF) signal 52 from the beam reflected from the recording medium 12 during recording. If the apparatus is used for reading data on the medium 12, the signal generated by the data detector 30 would be referred to as a data signal. Both the front facet detector 22 and the data detector 30 can be, for example, a positive-intrinsic-negative (PIN) photodiode, an avalanche photodiode, or any other device capable of detecting incident optical radiation. Focus and tracking signals are also typically generated in the return path. A number of methods are well known to those skilled in the art and are not shown.

The FF signal 50 and MF signal 52 are applied to an MFE signal generator 35. The MFE signal generator 35 includes a variable delay element 36, a variable gain amplifier 34, a balancing error circuit 32, and an MFE signal processor 38. The FF signal 50 and the MF signal 52 are applied to the balancing error circuit 32 which generates an adjustment signal 54 as the difference between the FF signal 50 and the MF signal 52. The FF signal 50 is applied to the variable gain amplifier 34 with the adjustment signal 54 used as the gain control to produce a gain adjusted FF signal 56 with the same low frequency content as the MF signal 52.

The MF signal 52 is applied to the variable delay element 36 to produce a delayed MF signal 58. The delayed MF signal 58 provides proper phase matching of the FF signal 50 and the MF signal 52 at the input of the MFE signal processor 38. Methods of controlling the gain and phase (i.e., balancing error circuit 32 and variable delay element 36) are disclosed, for example, in commonly assigned U.S. Pat. Nos. 5,491,682 and 5,561,655, and in commonly-assigned U.S. patent application Ser. Nos. 08/397,293 and 08/397,701. In general, the variable gain amplifier 34 exhibits a relatively linear group delay response. A constant group delay can generally be considered as a fixed signal propagation time independent of frequency. Thus, the FF and MF signal channels can be phase equalized using, for example, an analog delay line providing a fixed amount of delay. The delay element 36 can therefore be, for example, a manually or electronically controlled programmable delay line which provides a selectable amount of delay in discrete increments, or a multiple delay line providing a desired total amount of delay. One suitable device is the ten nanosecond, ten tap variable delay line part No. 60Z14A010H form Sprague Electric Co. of Stamford, Conn. Alternatively, the delay element 36 can be a fixed amount of delay calculated to provide the desired phase matching at the input of the MFE signal processor 38. The term "delay line" as used herein refers to devices providing either fixed or adjustable amounts of delay using physical lengths of transmission line or any other suitable delay mechanism. The amount of delay provided by the delay element 36 will generally vary depending upon the relative timing of the FF and MF signal paths. It is preferred that the phase difference between the two signals at the input of the MFE signal processor 38 be reduced to a value less than about five degrees at the highest data signal frequency of interest, although larger phase differences can be acceptable in a given application. Of course, reducing the phase difference to zero will produce maximum common-mode noise rejection in the MFE signal processor 38.

The MFE signal processor 38 receives the delayed MF signal 58 and the gain adjusted FF signal 56, and generates an MFE signal 60 indicative of some aspect of mark formation quality, such as the resulting mark length, in a manner to be discussed in greater detail below. Using MFE signal comparison electronics 40, the MFE signal 60 is then compared to an optimum, or previously stored reference, value of an MFE signal which was previously determined during calibration. The previously determined MFE reference signal 62 can be stored, for example, in a portion of a recording system memory (not shown). The storage and retrieval of the MFE reference signal 62 in memory can be controlled, for example, by a recording system processor (not shown).

Deviation of the generated MFE signal 60 from the stored MFE reference signal 62 is indicative of improper mark formation on the optical recording medium 12. The MFE signal comparison electronics 40 then generates a write laser control signal 64 in response to the generated MFE signal 60 and the stored MFE reference signal 62. The write laser control signal 64 is applied to a write laser power control circuit 44 during actual data recording which produces a laser power adjustment signal 66. The laser power adjustment signal 66 is used to produce the laser write power which generates the MFE signal 60 which corresponds to the stored MFE reference signal 62 in order to compensate for any deviation during recording. Thus, the laser write power is adjusted as a function of the reflectivity of the marks formed by the laser 10. It will be understood by one skilled in the art that by subtracting the FF signal 50 from the MF signal 52, both the dynamic range and the signal to noise ratio of the laser power adjustment signal 66 increase due to canceling out the presence of unwanted common mode signal and noise.

The generation of the MFE signal 60 will now be discussed. The MF signal 52 generated by the data detector 30 from the return beam reflected from the recording medium 12 is given by:

$$MF = hI(t)R(t) \qquad (1)$$

where h is the efficiency of the return path and the photodetection process, I(t) is the light intensity at the recording layer of the recording medium 12, and R(t) is the reflectivity of the recording medium 12 under the optical spot.

The gain adjusted FF signal is given by:

$$GAFF = aI(t) \qquad (2)$$

where "a" contains the efficiency of the front facet detector 22 and amplification by the variable gain amplifier 34, and is defined by:

$$a = h\langle R(t) \rangle \qquad (3)$$

where the brackets indicate a time average.

In a first embodiment of the present invention, a difference signal, DS, is formed in the MFE signal processor 38 by:

$$DS=MF-GAFF \qquad (4)$$

Comparing the difference signal, DS, and the MF signal 52 during read or write, it will be evident to one skilled in the art that use of the difference signal, DS, has improved the dynamic range and removed unwanted common mode signal and noise.

$$MF = hI(t)[R + ÆR(t)] \qquad (5)$$
$$DS = hI(t)ÆR(t) \qquad (6)$$

where R is the average reflectivity of the recording medium 12 and ÆR is the reflectivity changes due to mark formation or recorded information. Comparing equations (5) and (6) above, the large h I(t) R term is removed from the MF signal 52. Thus, if there is no mark formation or written data, DS=0.

Figure 3:
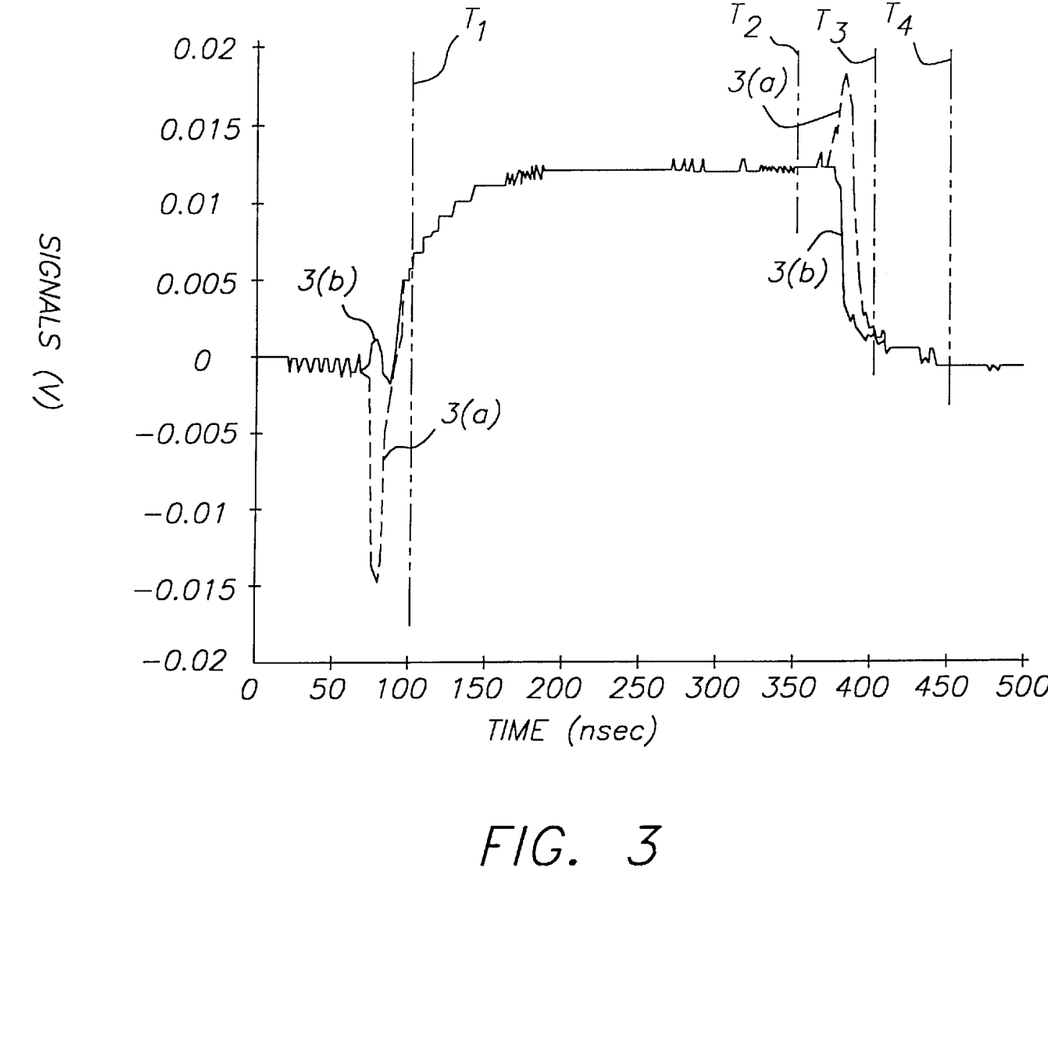
FIG. 3. is a graph of signal versus time showing two signals, each of which is a difference between the mark formation signal and the gain adjusted front facet signal as a function of time.

Referring now to FIG. 3, the difference signal (DS=MF−GAFF) for a recording power versus time, T, is shown. The difference signal, which is designated as 3(a), has positive and negative peaks at the beginning and end of the laser write pulse. This phenomenon is primarily due to a time delay of approximately 5 nanoseconds between the MF signal 52 and the gain adjusted FF signal 56. This time delay can be due to processing electronics or the way the signals are sampled. Therefore, inserting an additional 5 nanosecond delay into one of the faster signals prior to differencing substantially eliminates the peaks, as shown in the difference signal designated as 3(b). However, it should be noted that other electronic phenomena, such as slew rate and bandwidth of the detectors or amplifiers, will cause a difference in the rise and fall time between the gain adjusted FF signal 56 and the MF signal 52 making it difficult to completely match their phases. It is therefore desirable to define an MFE signal (which is a figure of merit) that is insensitive to the edges of the recording pulse. One such MFE signal can be defined as an average or integral of the difference signal, DS, over many recording pulses. An alternative MFE signal can be defined as a function of a sampling of the difference signal, DS, during the recording pulse, i.e., anywhere between T1 and T2 as indicated in FIG. 3, or sampling the difference signal, DS, during the read power portion, i.e., anywhere between T3 and T4 as indicated in FIG. 3. Note that times T1, T2, T3, and T4 are determined according to media type and recording strategy. It would be understood by those skilled in the art that the MFE signal could be detected during a gated window portion either during or after the write pulse.

In order to cancel out the effect of reflectivity fluctuations, it is important to additionally normalize the MFE signal by the media reflectivity itself. The reflectivity of the recording medium 12 can be monitored by sampling the mark formation signal, MF, between recording pulses (>T4) and normalizing it by the read power. If the read power is maintained at a constant value by a FF power servo (such as the read laser power control circuit 46 in FIG. 2) as is typically done, a normalized figure of merit can be defined as:

$$MFE=DS/(MF@t>T4) \qquad (7)$$

As with any normalization scheme that requires dividers, provisions should be made when the recording spot encounters an "obscuration" which drastically diminishes the amount of light reflected back to the detectors. Such provisions might include voltage limiting circuitry that limit the read or write current delivered to the laser.

In a second embodiment of the present invention, another figure of merit can be defined as the ratio of MF to FF during the period defined, for example, by T1 and T2, or T3 and T4:

$$MFE=MF/FF<T1 \ldots T2> \qquad (8)$$

or $$MFE=MF/FF<T3 \ldots T4> \qquad (9)$$

Figure 4:
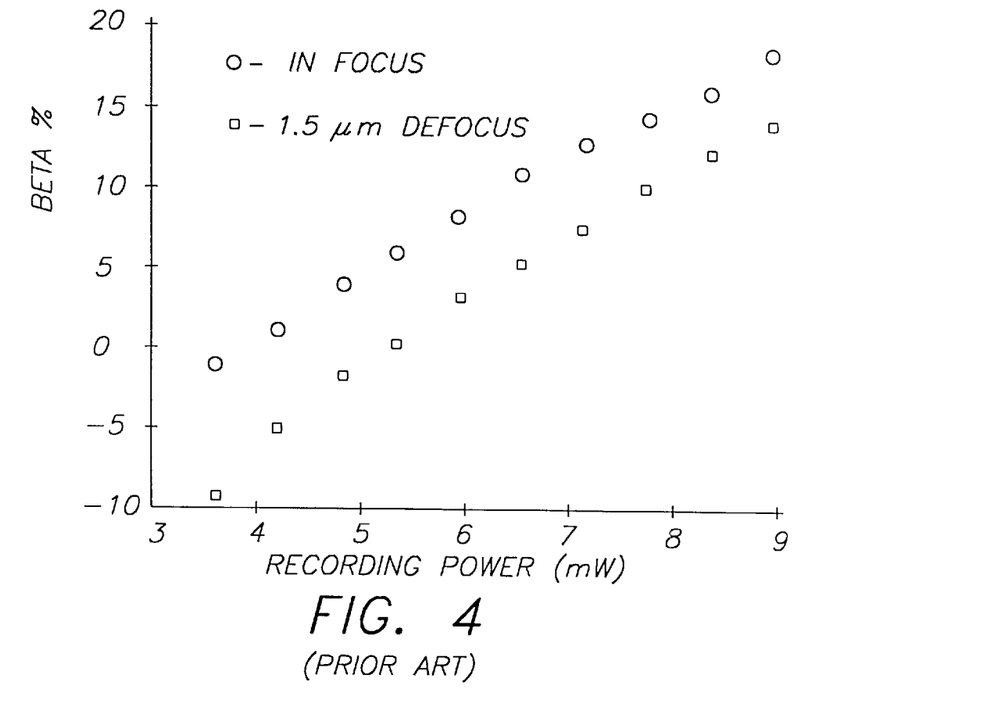
FIG. 4. is a graph of Beta in percent versus recording power for a typical prior art recording apparatus.
Figure 5:
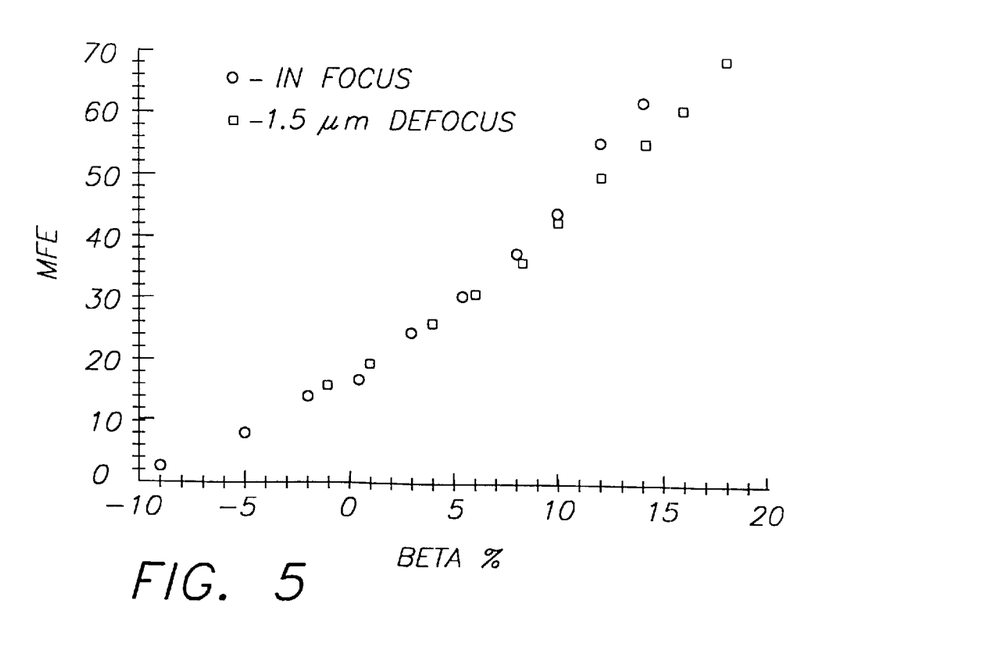
FIG. 5. is a graph of a mark formation effectiveness signal versus Beta in percent for a recording apparatus in accordance with the present invention such as shown in FIG. 2.

FIGS. 4 and 5 illustrate a comparative example of the effectiveness of the present invention. FIG. 4. shows a plot of Beta in percent versus laser write power with and without optical spot defocus for a typical prior art recording apparatus. As expected, the defocused condition is less effective in marking the media. This yields shorter recorded marks, and hence, lower Beta. If the media was written at a constant power, a change in focus would lead to poor mark formation.

FIG. 5 displays the relationship of the MFE signal 60 as defined in equation (7) versus Beta in percent with and without optical spot defocus for a recording apparatus in accordance with the present invention. As shown in FIG. 5, the MFE signal chosen correlates well to Beta in either case. Thus, by varying the laser write power to maintain a constant MFE signal, a constant Beta recording would be performed even with optical spot defocus. This method will also maintain recording quality during changes in focus, media sensitivity, birefringence, temperature, and other system disturbances.

The difference of the MFE signal 60 and the MFE reference signal 62 also provides a measure of the written mark quality. Write quality, WQ, is defined by:

$$WQ=<MFE-MFE\ reference>/MFE\ reference \qquad (10)$$

where <MFE−MFE reference> denotes time averaging.

By normalizing and storing WQ, written mark quality can be monitored. Referring again to FIG. 2, the MFE signal comparison electronics 40 can generate a write quality comparison signal 68 as a function of WQ. The write quality comparison signal 68 is applied to a write quality controller 68 to monitor written mark quality. WQ can then be used to determine further action, such as stopping recording or verifying the data by reading. The determination of further action can be judged by threshold levels to be compared to WQ based on the given application of the recording apparatus. For example, audio recording may choose to tolerate a poorer write quality signal than a digital storage application.

The invention has been described in detail with particular reference to a preferred embodiment thereof. However, it will be appreciated that variations and modifications can be effected by a person of ordinary skill in the art without departing from the spirit and scope of the invention.

PARTS LIST 10 optical source
12 optical recording medium
13 collimating lens
14 objective lens
15 quarter wave plate
16 beam splitter surface
18 beam splitter
20 detector focusing lens
22 front facet detector
24 focusing lens 28 data focusing lens
30 data detector
32 balancing error circuit
34 variable gain amplifier
35 MFE signal generator
36 variable delay element
38 MFE signal processor
40 MFE signal comparison electronics
44 write laser power control circuit
46 read laser power control circuit
50 front facet signal
52 mark formation signal
54 adjustment signal
56 gain adjusted front facet signal
60 mark formation effectiveness signal
62 mark formation effectiveness reference signal
64 write laser control signal
66 laser power adjustment signal
68 write quality comparison signal
70 write quality controller

What is claimed is:

1. A recording apparatus for forming marks on a medium, comprising:
   (a) means including an adjustable light source for producing a beam of light having first and second portions, with the second portion for recording marks on the medium;
   (b) means responsive to the first portion of the light beam and including a front facet detector positioned to receive the first portion of the light beam directly from the light source for producing a front facet signal;
   (c) means for detecting light from the second portion of the light beam which is reflected from the medium and for producing a mark formation signal;
   (d) balancing error means responsive to the front facet signal and the mark formation signal for producing an adjustment signal which is a function of a difference between the two signals;
   (f) variable gain means responsive to the front facet signal and the adjustment signal for producing a gain adjusted front facet signal;
   (g) means responsive to the gain adjusted front facet signal and the mark formation signal for producing a mark formation effectiveness signal;
   (h) means for storing a mark formation effectiveness reference signal; and
   (i) means responsive to the mark formation effectiveness signal and the mark formation effectiveness reference signal for adjusting the power of the light source during recording so that the amount of power is adjusted to maintain optimum mark quality.

2. The recording apparatus of claim 1 further including means responsive to the mark formation effectiveness signal and the mark formation effectiveness reference signal for verifying recorded mark quality.

3. The recording apparatus of claim 1 wherein the light source is a laser.

4. The recording apparatus of claim 1 wherein the mark formation effectiveness signal producing means includes variable delay means responsive to the mark formation signal for delaying the mark formation signal.

5. The recording apparatus of claim 1 wherein the stored mark formation effectiveness reference signal is the mark formation effectiveness signal at optimum recording power.

6. The recording apparatus of claim 5 wherein the light source power adjusting means further includes:

(i) means responsive to the mark formation effectiveness signal and the mark formation effectiveness reference signal for determining that mark formation has deviated from optimum; and
   (ii) means for adjusting the light source power to compensate for the deviation.

7. The recording apparatus of claim 5 wherein the mark formation effectiveness signal is determined by the following relationship:

$$MFE = DS/R$$

wherein MFE is the mark formation effectiveness signal, DS is a difference of the mark formation signal and the gain adjusted front facet signal, and R is a normalizing factor which is a function of medium reflectance.

8. The recording apparatus of claim 7 wherein R is the mark formation signal from an unmarked region of the medium.

9. The recording apparatus of claim 7 wherein R is medium reflectance in an unmarked region.

10. The recording apparatus of claim 5 wherein the mark formation effectiveness signal is determined by the following relationship:

$$MFE = MF/FF$$

wherein MFE is the mark formation effectiveness signal, MF is the mark formation signal, and FF is the front facet signal.

11. A recording apparatus for forming marks on a medium, comprising:
   (a) means including an adjustable light source for producing a beam of light having first and second portions, with the second portion for recording marks on the medium;
   (b) means responsive to the first portion of the light beam and including a front facet detector positioned to receive the first portion of the light beam directly from the light source for producing a front facet signal;
   (c) means for detecting light from the second portion of the light beam which is reflected from the medium and for producing a mark formation signal;
   (d) balancing error means responsive to the front facet signal and the mark formation signal for producing an adjustment signal which is a function of a difference between the two signals;
   (e) variable gain means responsive to the front facet signal and the adjustment signal for producing a gain adjusted front facet signal;
   (f) means responsive to the mark formation signal and the gain adjusted front facet signal for producing a mark formation effectiveness signal;
   (g) means for storing a mark formation effectiveness reference signal;
   (h) means responsive to the mark formation effectiveness signal and the mark formation effectiveness reference signal for producing a light source power adjustment signal; and
   (i) means responsive to the light source power adjustment signal for adjusting the power of the light source during recording so that the amount of power is adjusted to maintain optimum mark quality.

12. The recording apparatus of claim 11 further including means responsive to the mark formation effectiveness signal and the mark formation effectiveness reference signal for verifying recorded mark quality.

13. The recording apparatus of claim 11 wherein the light source is a laser.

14. The recording apparatus of claim 11 wherein the mark formation effectiveness signal producing means includes variable delay means responsive to the mark formation signal for delaying the mark formation signal.

15. The recording apparatus of claim 11 wherein the mark formation effectiveness reference signal is the mark formation effectiveness signal at optimum recording power.

16. The recording apparatus of claim 15 wherein the light source power adjusting means further includes:
   (i) means responsive to the mark formation effectiveness signal and the mark formation effectiveness reference signal for determining that mark formation has deviated from optimum; and
   (ii) means for adjusting the light source power to compensate for the deviation.

17. The recording apparatus of claim 15 wherein the mark formation effectiveness signal is determined by the following relationship:

$$MFE=DS/R$$

wherein MFE is the mark formation effectiveness signal, DS is a difference of the mark formation signal and the gain adjusted front facet signal, and R is a normalizing factor which is a function of medium reflectance.

18. The recording apparatus of claim 17 wherein R is the mark formation signal from an unmarked region of the medium.

19. The recording apparatus of claim 17 wherein R is medium reflectance in an unmarked region.

20. The recording apparatus of claim 15 wherein the mark formation effectiveness signal is determined by the following relationship:

$$MFE=MF/FF$$

wherein MFE is the mark formation effectiveness signal, MF is the mark formation signal, and FF is the front facet signal.

21. A method of forming marks on a recording medium, comprising the steps of:
   (a) producing a beam of light having first and second portions;
   (b) directing the first portion of the light beam directly to a front facet detector;
   (c) producing a front facet signal from the first portion of the laser light beam directed to the front facet detector;
   (d) directing the second portion of the light beam to the medium for recording marks on the medium;
   (e) producing a mark formation signal from the second portion of the laser light beam reflected from the medium;
   (f) producing an adjustment signal in response to the front facet signal and the mark formation signal, the adjustment signal being a function of a difference between the front facet signal and the mark formation signal;
   (g) producing a gain adjusted front facet signal in response to the front facet signal and the adjustment signal;
   (h) producing a mark formation effectiveness signal in response to the gain adjusted front facet signal and the mark formation signal;
   (i) storing a mark formation effectiveness reference signal;
   (j) adjusting the power of the light beam during mark formation in response to the mark formation effectiveness signal and the mark formation effectiveness reference signal so that the amount of power is adjusted to maintain optimum mark quality; and
   (k) verifying recorded mark quality in response to the mark formation effectiveness signal and the mark formation effectiveness reference signal.

* * * * *